Nov. 22, 1960     B. N. RICKARD     2,961,070
WHEEL CHOCK
Filed Feb. 13, 1958     2 Sheets-Sheet 1
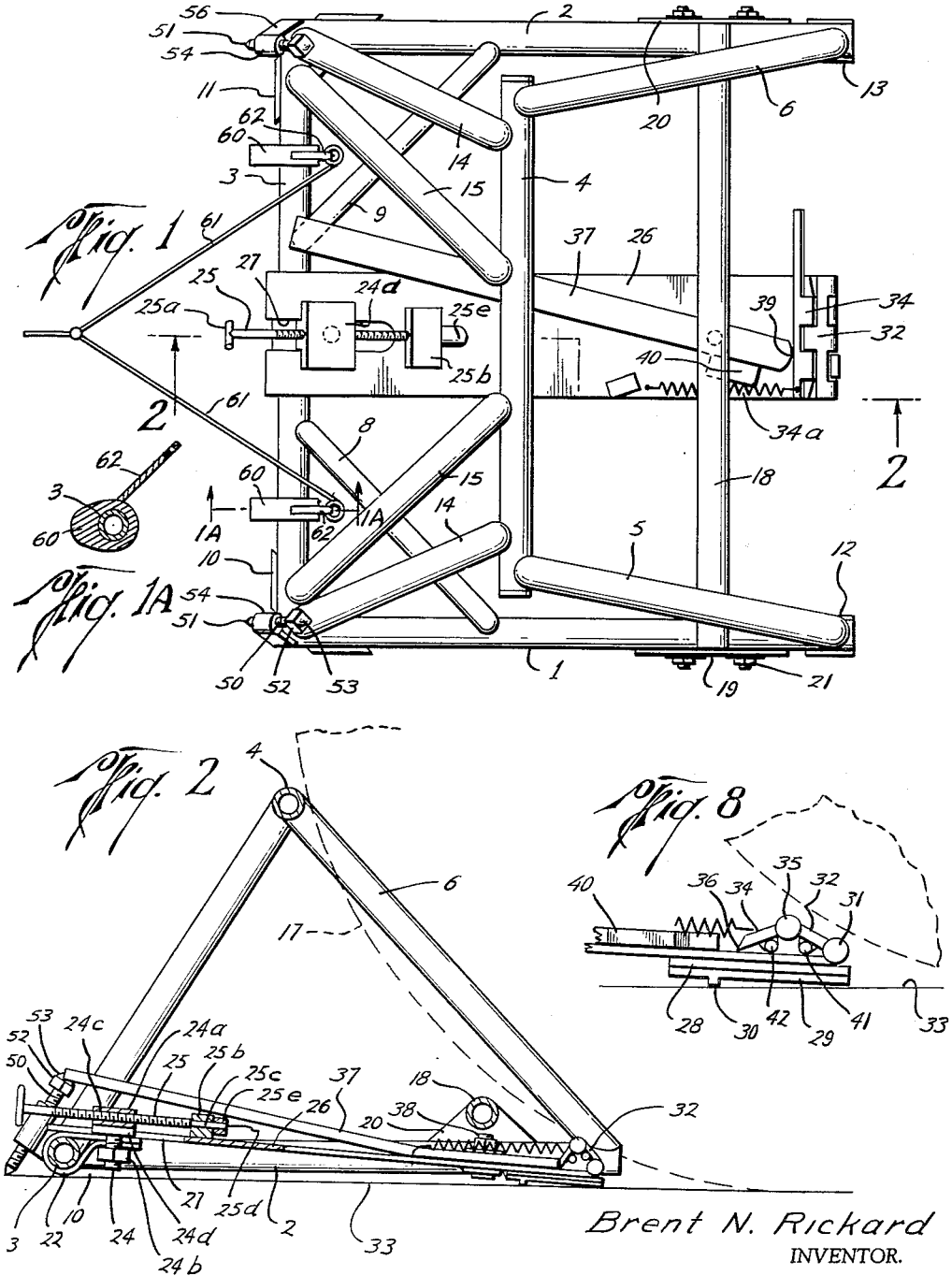
Brent N. Rickard
INVENTOR.
BY
ATTORNEYS

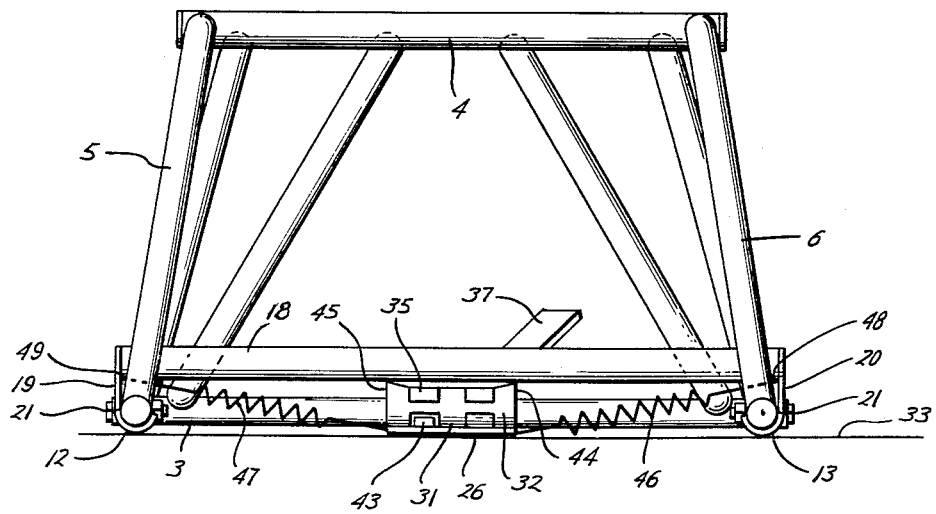
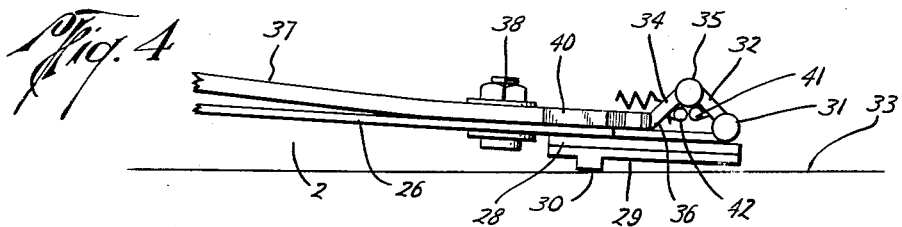
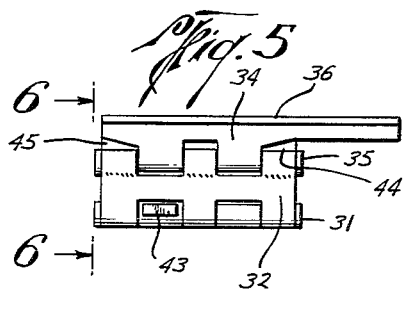
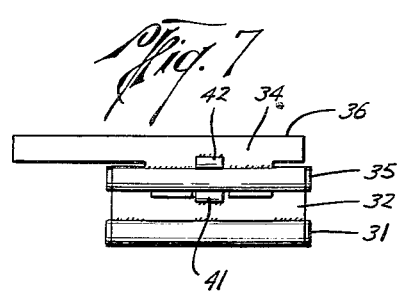
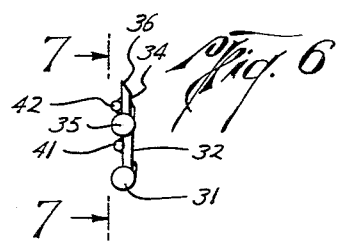
Brent N. Rickard
INVENTOR.

United States Patent Office 2,961,070
Patented Nov. 22, 1960

2,961,070

WHEEL CHOCK

Brent N. Rickard, Houston, Tex.
(R.F.D. 2, Sunset Cove, Brookfield, Conn.)

Filed Feb. 13, 1958, Ser. No. 715,032

13 Claims. (Cl. 188—32)

This invention relates to wheel chocks used for preventing the movement of wheeled vehicles along the ground or other support, being applicable especially to vehicles such as aircraft, trucks, busses and the like, which at times must be left standing for a short or long period while subject to the influence of wind tending to move them or to the influence of gravity tending to pull them down an inclined support on which they may be parked.

While the use of wheel chocks for trucks, busses and industrial shop vehicles is well known, those which have been employed in the past have had certain inherent shortcomings in providing a complete solution to the problems attendant upon the use of such chocks. These problems are especially acute in connection with the use of chocks for heavy vehicles and are multiplied even more in connection with the use of chocks for large aircraft having values running into the millions of dollars. The following discussion of this invention will be directed particularly to the problems attendant upon the use of chocks in connection with airplanes, but it will be understood that the chocks of this invention are equally applicable to use with other vehicles.

When aircraft are parked for periods ranging from a few minutes to many days, it is customary to employ chocks against the aircraft's wheels instead of depending upon setting their brakes because the setting of brakes might cause the "freezing" of hot brakes, or the brakes might be released through failure or gradual pressure loss from the brake system in the case of a hydraulic brake system. Many airport ramps are sloped and numerous instances have occurred in which the chocks used to block the wheels of an aircraft were pushed ahead of the wheels by the forward component of force as the aircraft began to roll. Square or angular wooden blocks commonly used as chocks have been known to float away in the run-off of heavy rainstorms. In the use of large steel chocks and also wooden chocks in front of the main landing gear wheels of aircraft, either with or without the locking of the aircraft brakes during power checking of the engines, damage has often occurred because of one or more chocks "skiing" under the wheel along an oily or slick ramp. Also, in such instances the chocks may sometimes be pushed ahead of a rolling wheel if the brakes become released. In either case, the movement of the aircraft may not be noticed by mechanics busy with checking instruments until the whirling propellers strike a battery cart, ladder, or other equipment in front of the aircraft. Many aircraft fires have resulted from ruptured power cart gasoline tanks in such cases. Aside from the great physical damage and possible loss of life incurred in such accidents, there is the attendant cost of lost revenue during the time the aircraft is laid up for repairs, and the cost of ferrying of replacement aircraft and of passenger inconvenience.

In certain types of ordinary chocks, attempts have been made to avoid the above-mentioned disadvantages by providing a part of the chock which will be pinched under the wheel or upon which the wheel will rest when the chock is in use. However, with such a structure, its use with heavy aircraft on a sloping ramp has the very great disadvantage of requiring the use of a sledge hammer or the like to knock the chocks loose once they have become pinched under the wheels. This is not only difficult and time consuming, but causes annoyance to the passengers and damage to the chocks as well as possible damage to the aircraft.

In view of the foregoing, it is an object of this invention to provide a chock having a part which is pinched between the wheel and the surface on which the wheel is normally supported, thus preventing the chock from being pushed ahead of the wheel, yet in which the chock may be readily removed even when it has become tightly pinched between the wheel and the supporting surface.

Another object of this invention is to provide a chock employing parts on which the tire may ride, for reducing the possibility of a locked tire "skiing" on the chock under propeller thrust or gravity on an oily or otherwise slick ramp.

Another object of this invention is to provide a quick release means for freeing a chock having a portion pinched under a wheel, so that the chock may be manually pulled free from the wheel without excessive force or previous forcing of wheel movement.

Another object of this invention is to provide a chock that is adjustable for adaptation to wheels of various sizes.

Another object is to provide a chock with parts which will dig in and anchor more firmly upon slight overturning tendency under load.

Other objects and advantages of this invention will become apparent from the following description taken in connection with the accompanying drawing wherein one embodiment of this invention is set forth by way of illustration and example.

In the drawing:

Fig. 1 is a top plan view illustrating a chock constructed in accordance with this invention, the wheel engaging shoe portion thereof being shown in position to engage and be held by a wheel;

Fig. 1A is a vertical cross section taken along line 1A—1A of Fig. 1 showing the cam for raising the front of the chock, the cam being shown in the base lowering position;

Fig. 2 is a view in vertical cross-section taken along the line of 2—2 of Fig. 1 and showing in dotted outline the manner in which a wheel cooperates with a chock constructed in accordance with this invention;

Fig. 3 is a view in front elevation showing the structure illustrated in Figs. 1 and 2 viewed from the right or rear end thereof as seen in Figs. 1 and 2;

Fig. 4 is a fragmentary view on enlarged scale showing the wheel engaging portions of the shoe of the chock latched in erect or wheel engaging position and viewed in elevation from one side thereof;

Fig. 5 is a top plan view of the collapsible wheel engaging portion of the shoe illustrated in Fig. 4, same being shown in collapsed position;

Fig. 6 is a view in elevation taken from the left end of Fig. 5 along the line 6—6; and Fig. 7 is a bottom plan view of the structure shown in Figs. 5 and 6 taken along the line 7—7 of Fig. 6.

Figure 8 is a fragmentary view showing the wheel engaging portions of the shoe of the chock in released position and viewed in elevation from one side thereof.

In general, it is the concept of this invention to provide a chock with an anchoring shoe portion which, when a wheel is engaged by the chock, will fit beneath and be pinched underneath a portion of the wheel in such manner as to force the shoe against the surface on which the wheel is resting and hold the shoe and hence the chock as a whole against forward motion by virtue of the frictional engagement between the shoe and the support, the shoe and the wheel, and the wheel and the support, yet to make this part thus adapted to be pinched under the wheel such that it can be released and allowed to move away from the wheel thereby relieving the pinching action and releasing the chock for removal from the wheel quickly and without excessive effort.

Referring more in detail to the drawings, a chock may be constructed in accordance with this invention from numerous types of materials but may be fabricated with great advantage principally from tubing and bar and sheet stock of steel, aluminum or the like. In the case illustrated, tubing is employed to provide a base having two side members or base bars 1 and 2, and a front member or base bar 3, as well as a stopping bar 4 and rear support bars 5 and 6 carrying the stopping bar. These parts, in the example shown, are separate straight pieces of tubing welded or otherwise suitably secured together, although obviously they may be formed or joined together otherwise if desired. The stopping bar 4 is positioned intermediate the ends of the side base bars 1 and 2 and is substantially parallel to the front base bar 3, being positioned, however, somewhat above the base formed by the side and front base bars.

In order to give additional rigidity to the base, each of the forward corners between the side base bars and the front base bar are provided with diagonal brace bars as indicated at 8 and 9, which likewise may be pieces of tubing welded or otherwise suitably secured to the front and side base bars in the positions indicated in the drawing. The front corners of the base may be further reinforced and provided with concentrated bearing surfaces to rest upon a floor or other support by means of a pair of front skid plates 10 and 11 disposed diagonally underneath said corners. These preferably have upturned portions along the outsides of the side and front base bars which may be welded to such base bars or secured in some other suitable manner thereto, and are formed of highly wear-resistant material.

At the rear ends of the side base bars there are preferably provided rear skid plates which may be substantially U-shaped members 12 and 13, likewise of highly wear-resistant material, fitting about the under portion of each side base bar at its rear end and suitably secured thereto as by welding or the like.

In order to provide an extremely strong support for the stopping bar 4 which, it will be understood, will bear the major portion of the force of holding a wheel against movement, there are provided two pairs of front bars 14 and 15 which may be formed of pieces of tubing welded or otherwise suitably secured at their ends to the stopping bar 4 and the front bar 3. Thus, it will be seen, particularly in Fig. 2, that a triangular chock frame structure is provided by the base formed of the side base bars and the front base bar together with the front and rear skid plates and the diagonal reinforcing members 8 and 9, and a stopping bar 4 mounted on and spaced from the base and rigidly positioned with respect thereto so as to receive the forward portion of a wheel engaging the chock and absorb the major force opposing movement of such wheel.

The position of a wheel as it bears heavily against the chock is indicated in dotted lines at 17 in Fig. 2, from which it will be apparent that a substantial component of the force exerted by the wheel on the chock tending to move it forwardly will be in a direction tending to overturn the chock pivoting the same about the front corner of the base at the front base bare 3. This invention provides means which will prevent such overturning of the chock. This function is accomplished in the present embodiment by what might be called the overturn bar 18 positioned adjacent the rearmost portion of the chock so that it will underlie a substantial portion of a wheel in engagement with the chock and tend to engage such wheel with a movement substantially directly upwardly in the event of the beginning of an overturning movement of the chock. Thus the overturning of the chock will be prevented by engagement of the overturn bar with the under portion of the wheel.

The overturn bar 18 may be secured to the frame of the chock in any suitable fashion which will position it out of the way of the anchor shoe presently to be described and yet in such position that it will come into engagement with the wheel almost immediately upon the beginning of an overturning movement of the chock due to contact from a wheel.

In the drawing this bar is shown as being mounted by being welded at its ends to the overturn bar plates 19 and 20, these plates being of more or less triangular shape and disposed in vertical planes such that their upper edges will diverge downwardly from the point of their attachment with the bar 18, and such that the lower portions of the plates will just engage the outer surfaces of the side base bars 1 and 2. These plates are then secured to the side base bars in suitable fashion as by bolts 21.

In order to prevent the forward sliding movement of the chock under the pressure applied by the wheel of a vehicle having a tendency to roll, there is provided the anchor shoe mounted and constructed as follows.

Pivotally secured to the front base bar 3 is a bracket 22 in the form of a heavy metal strap passing around the bar 3 and having its ends engaging each other and extending toward the rear of the chock, with the plane of the engagement of said ends with each other substantially tangent to the top side of bar 3. These ends have registering openings therethrough receiving the threaded stem 24 which carries the adjusting block and guide 24a. A nut 24b threaded on stem 24 clamps the bracket ends together and secures the block 24a thereto. This bracket 22 and block 24a mounted and secured together in this fashion provide the principal mounting for the anchor shoe on the base of the chock.

Block 24a has an opening 24c therethrough threaded to receive a threaded adjusting stem 25. Stem 25 has a knob 25a or other means of turning it on its front end, and at its rear end is rotatably but non-slidably engaged in a thrust bearing block 25b fixed on a shoe strap 26 forming part of the anchor shoe. The part 25c of stem 25, which passes through the bearing block 25b is of smaller diameter than the threaded portion of the stem, thereby limiting its rearward movement through the block 25b. An end 25d, which projects beyond the block 25b, has a collar 25e fixed thereon to limit forward movement of the stem through the block 25b. The block 24a has a narrow part 24d with parallel sides adjacent the bracket 22, providing a guide for forward and rearward movement of the shoe strap 26 as the threaded adjusting stem 25 is turned to adjust the strap 26 forwardly and rearwardly. The stem 25 and its cooperating parts just described not only constitute an adjustable connection but also a jack since the operation of the stem propels the parts with respect to each other from one adjustment to another.

The strap 26 has a slot or notch 27 extending from its front end and adapted to engage and slide forwardly and rearwardly of the chock along the guide part 24d of the block 24a.

At its end opposite the bracket 22 the shoe strap 26 is provided on its under surface at a point substantially in alignment with the rear ends of the side base bars with other parts of the anchor shoe comprising a reinforcing skid plate 28 secured to the strap 26 in any suitable fashion and a replaceable shoe skid 29 having a downwardly projecting flange or other protrusion 30 on its under surface secured to the lower surface of the shoe reinforcing plate 28. This downwardly projecting portion 30 may take any form desired for the purpose of frictionally engaging and preventing sliding movement thereof with respect to a support on which it may be used, such as a ramp or pavement for parking an airplane or the like.

Hingedly connected to the rear end of the strap 26 by means of a hinge connection 31 is a collapsible anchor shoe portion comprising a plate or strap 32 adapted to be moved to an erect position such as shown in Fig. 2 in which it will engage the underside of a wheel 17 resting against the stopping bar 4 and upon a support surface 33, and collapsible to a position against the anchor shoe strap 26 such as shown in Fig. 8 in which it is disengaged from such wheel. Obviously, when in the position shown in Fig. 2, any forward movement of the wheel toward the chock tending to slide the chock along the supporting surface 33 will tend to cause the wheel to rotate. The engagement of the wheel with the upper edge of the wheel engaging collapsible anchor shoe portion 32, when it is in the erect position shown in Fig. 2, will have the effect of placing weight on the rear end of the anchor shoe provided by shoe strap 26 and this plate 32 and press the anchor shoe skid 29 into firm frictional engagement with the surface 33 so as to prevent such sliding movement of the chock. At the same time, the tendency will be to draw the anchor shoe further under the wheel and more tightly engage it with the supporting surface 33 as the tendency of the wheel to move forward increases.

On the other hand, when it is desired to remove the chock from the wheel, the engagement between the plate 32 and the wheel may be readily released by releasing the plate 32 for hinging movement about the hinge 31 to the collapsed position illustrated in Fig. 8. In this hinging movement this plate moves with respect to the base of the chock and away from the wheel and hence releases therefrom without necessity for application of any force such as the hammering required to release presently employed chocks from wheels under similar circumstances.

The plate or link 32 may be maintained in its erect wheel engaging position shown in Fig. 2 by any suitable means which may be readily released to permit it to move to the collapsed position shown in Fig. 8. One such means is the auxiliary plate 34 hinged to the upper edge of the plate 32 at 35 and having its free edge 36 resting against the upper surface of the strap 26 and slidable therealong.

When it is desired to have the plate 32 held in erect wheel engaging position, the lower edge 36 of the plate 34 will be slid rearwardly along the strap 26 until the parts occupy the position illustrated in Fig. 2 of the drawing with these two shoe parts 32 and 34 in an inverted V position as illustrated. For the purpose of setting and holding the links 32 and 34 in the position indicated, there is provided as an auxiliary part of the anchor shoe, a latch in the form of a release bar 37 pivotally mounted by means of a bolt 38 on the upper surface of the shoe strap 26. The short end of this release bar is of such length that when the bar is disposed in the position as shown in Fig. 1 it will bear at 39 against the link or plate 34 on the lower edge 36 of this plate. A limit stop 40 is mounted on the shoe strap 26 in such position as to stop the short end of the release bar in the position shown in Fig. 1. It will be seen that with the parts in this position the wheel engaging portion of the anchor shoe which is provided by the upper edges of the plates 32 and 34 where they are hinged together at 35, will be in its erect or wheel engaging position and will be so held by the latch provided by the release bar 37 and its related parts. However, it will further be seen that by moving the long end of the release bar 37 in a direction such as to move the short end of the bar away from the stop 40, it will be moved so as to no longer support the free edge 36 of the plate 34, and permit the plates 32 and 34 to collapse to a substantially reclining position on the shoe strap as illustrated in Fig. 8. Since it is pivoted on a part of the shoe which, although adjustable with respect to the base, is fixed to the base between adjustments, this latch is, in effect, interposed between the collapsible anchor shoe portion and the base.

For the purpose of insuring the collapse of the wheel engaging anchor shoe portion provided by the plates 32 and 34 when the latch is released, a spring 34a is provided secured at one end to the plate 34 and at the other to strap 26, as shown in Fig. 1. Plate 34 also has an extension 34b from one end thereof so that when the plate 34 is reposing on the strap 26 and the latch bar is swung toward latch position it will engage the edge of this extension and move the two plates to their erected position.

In order to limit the extent of erection of the wheel engaging parts so that the part 34 cannot fold flat against the part 32 and provide it with inadequate support, both of these parts are provided with stops in the form of short pieces of welding rod or the like welded to their lower surfaces as shown at 41 and 42. These rods serve not only the purpose of limiting the upward movement of the hinge between the parts 32 and 34 as shown in Fig. 2, but also serve to prevent these parts from moving to a completely flattened position against the shoe strap 26 as shown in Fig. 8. With the upward movement of the parts limited as shown in Fig. 2, then when the release bar constituting the latch holding them in erect position is removed, the spring 34a and the weight placed upon them by the wheel will cause them to move readily to reclining position as shown in Fig. 8. On the other hand, when they are in the position shown in Fig. 8, being held partly erect by the short sections of rod 41 and 42, movement of the release bar 37 back toward the position shown in Fig. 1 will cause the parts 32 and 34 to move again to their erect or wheel engaging position, whereas if they were lying flat against the shoe strap they would be very difficult to move to erected position by merely movement of the release bar.

In order to keep the plate 32 from accidentally becoming rotated too far to the right as seen in Figs. 2 and 8, and thereupon allowed to swing over toward a position of alignment with the shoe strap 26, the hinge part on the shoe strap is provided with a lug 43 that will engage a portion of the strap 32 and limit its movement in a direction of right-hand rotation about the hinge 31 as these parts are seen in Figs. 1 and 2, in order to prevent the plate 34 from swinging in a clockwise direction around the hinge 35 as these parts 32 and 34 are seen in Figs. 2 and 8, so that the part 34 might lie on top of the part 32, the hinge portion of the part 32 may be provided, as shown in Fig. 5, with welded on lugs or portions 44 and 45 that will engage the part 34 and limit its swinging movement about the hinge 35 in a clockwise direction.

For the purpose of supporting the rearward end of the shoe strap 26 with its associated parts so that it will be supported out of engagement with surface 33 while being handled, springs 46 and 47 are provided each suitably anchored as at 48 and 49, respectively, to an end of the overturn bar, and connected at their opposite ends, respectively, to the two sides of the shoe strap adjacent the free end of the shoe strap. At the same time, this type of support for the shoe strap will permit it to be engaged by a wheel as shown in Fig. 2 to be pressed downwardly tightly against whatever support 33 it may be resting upon, and cause the projecting part or parts 30 of the shoe skid to tightly grip such surface and prevent skidding of the chock.

From the foregoing it will be seen that in the use of a chock of this character the wheel engaging parts 32 and 34 will be moved to their erected position by proper manipulation of the release bar 37 and latched in such position by such release bar with the same in the position illustrated in Fig. 1. Then the chock will be moved in the usual fashion against the front side of a wheel to be held, and, with the shoe strap properly adjusted by proper adjustment of the stem 25 relative to the block 24a, the wheel will come very close to, although preferably not fully in contact with the stopping bar 4. When forced toward the chock, the wheel will tend to roll up on and pinch the wheel engaging portions 32 and 34 of the shoe against the surface 33. Further rolling movement of the wheel tending to skid the chock will be prevented by its engagement with the anchor shoe as just described. Any tendency of the chock to overturn will be countered by the engagement of the overturn bar 18 with the wheel as the overturning movement of the chock begins. Thus, a wheel held by this chock will be firmly held and tendency toward skidding or overturning will be completely counteracted.

In order to still further insure against skiing of the chock, a pair of adjustable spikes may be mounted on its forward corners. These are shown as screws 50 having hardened points 51 and hexagonal or other suitably shaped heads 52, rounded as shown at 53. These are threaded into tubes 54 suitably secured to the chock frame by webs 55 and 56, preferably in substantial parallelism to the plane of braces 14 and 15. These screws may be adjusted so that when the chock is at rest they will just clear the surface 33 and not interfere with sliding of the chock in handling, but close enough to such surface that upon slight movement of the chock toward overturning they will engage and dig into surface 33. This should effectively prevent skiing when surface 33 is hard but icy or oily. However, if desired, the screws 50 may be adjusted downwardly to engage or penetrate the surface 33 even when the chock is resting flat on the surface 33 so that they will prevent skiing even without any overturning movement. It is also contemplated that a cam 60 may be provided on the front of the base, rotatable from one position in which it permits the base to rest on support 33 to another in which it engages surface 33 to raise the front of the base and insure disengagement of the points 51 from surface 33. A rope or cable 61 for dragging the chock would be attached to a lever 62 integral with said cam to move it automatically to base lifting position when the rope or cable is pulled.

On the other hand, when it becomes desirable to remove the chock, it may be readily removed despite the fact that the wheel engaging parts of the shoe are at the time being tightly pinched by the wheel. This removal is accomplished by pulling on the latch bar 37 in a direction to move it counterclockwise as shown in Fig. 1 and release its holding effect upon the part 34. This permits the lower edge of the part 34 to slide along the top surface of the shoe strap 26 and the wheel engaging edges of the parts 32 and 34 to move directly away from the wheel until the pinching or holding effect of the wheel upon the shoe is removed and the chock may be taken out.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A wheel chock comprising a base having parts defining a plane and adapted to rest on a floor or the like, said plane being spaced from and substantially parallel to the floor or the like when the chock is in operative position, a wheel stopping member carried by and spaced laterally from said base in a direction upwardly from said plane when the chock is in operative position, and an anchor shoe secured to said base and positioned to underlie a portion of a wheel engaging said stopping member when the chock is in operative position on a floor or the like, a portion of said shoe adapted to so underlie a wheel being movable with respect to the base from a position engaging beneath a lower portion of such wheel to be held down thereby against the floor or the like and anchor the chock against sliding, to another position released from the holding effect of such wheel, and latch means interposed between such shoe portion and the base for maintaining said shoe portion in said first position and releasable while said shoe portion is in holding engagement with a wheel to permit said shoe portion to move to released position for removal of the chock from a wheel.

2. A wheel chock in accordance with claim 1 in which said shoe is adjustably connected to said wheel stopping member to adapt the chock to different sizes of wheels.

3. A chock in accordance with claim 1, said wheel engaging shoe portion being flexibly connected to said base to permit said portion to move toward and away from said plane and having a surface adapted to frictionally engage a support surface in said plane on which the base is resting when said shoe portion is in holding engagement with a wheel.

4. A wheel chock constructed in accordance with claim 1 in which said shoe is connected to said base by a jack means for adjustment with respect to said base while positioned adjacent a wheel so as to fit the chock to each individual wheel.

5. A wheel chock comprising a base having parts defining a plane and adapted to rest on a floor or the like, a wheel stopping member carried by and spaced from said base in a direction upwardly from said plane when the chock is in operative position, and an anchor shoe secured to said base and positioned to partly underlie a wheel engaging said stopping member when the chock is in operative position on a floor or the like, said shoe having two portions, one of which is a wheel engaging portion adapted to so underlie a wheel, said portions being movably mounted relative to one another for movement between first positions spaced vertically from one another sufficiently to simultaneously provide holding engagement with a wheel engaging said stopping member and with a floor on which said chock is resting, respectively, for anchoring the chock against skidding, and second positions closer to each other released from such holding engagement for permitting removal of the chock from a wheel, and latch means interposed between said movable portions for maintaining them in said first relative positions and releasable while said movable portions are in holding engagement between a wheel and floor to permit them to move to said second relative positions for permitting removal of the chock from such wheel.

6. A chock in accordance with claim 5 in which said shoe comprises said two portions one of which is connected to the base in approximate parallelism to said plane, and the other of which is said wheel engaging portion, the latter portion being pivotally mounted on said first portion and movable between a position erected at a larger angle to the first portion for holding engagement with a wheel and a position reclining at a lesser angle relative to said first portion for release from such holding engagement.

7. A chock in accordance with claim 5 in which said shoe comprises said two portions one of which is connected to the base in approximate parallelism to said base, and the other of which is said wheel engaging portion, the latter having two parts pivotally engaging each other and movably engaging said first portion at positions remote from their pivotal engagement with each other, said parts being movable between an erect position on said first portion in an inverted V-shape for holding engagement with a wheel and a position with said two parts reclining relative to said first portion for release from such holding engagement.

8. A chock in accordance with claim 5 in which said shoe comprises said two portions one of which is connected to the base in approximate parallelism to said plane, and the other of which is said wheel engaging portion, the latter having two parts one of which is pivotally connected to the first portion and the other of which slidably engages the first portion, said two parts pivotally engaging each other, and said two parts being movable between an erect position on said first portion in an inverted V-shape for holding engagement with a wheel and a position with said two parts reclining relative to said first portion for release from such holding engagement.

9. A chock in accordance with claim 5 in which said shoe comprises said two portions one of which is connected to the base in approximate parallelism to said plane, and the other of which is said wheel engaging portion, the latter having two parts one of which is pivotally connected to said first portion and the other of which slidably engages said first portion, said two parts being pivotally connected to each other and having their pivotal and sliding engagements with said first portion at positions remote from their pivotal engagement with each other, said two parts being movable between an erect position on said first portion in an inverted V-shape for holding engagement with a wheel and a position with said two parts reclining relative to said first portion for release from such holding engagement by sliding movement of the one of said two parts which slidably engages said first portion, and the latch means comprising a means for releasably latching said part which slidably engages the first portion against such sliding movement in a direction to collapse said two parts toward reclining position with respect to said first portion.

10. A wheel chock comprising a base having parts defining a plane and adapted to rest on a floor or the like, a wheel stopping member carried by and spaced laterally from said base in a direction upwardly from said plane when the chock is in operative position, and an anchor shoe secured to said base and positioned to partly underlie a wheel engaging said stopping member when the chock is in operative position on a floor or the like, a portion of said shoe adapted to so underlie a wheel being movable with respect to the base from a position engaging beneath a lower portion of such wheel to be held down thereby against the floor or the like and anchor the chock against sliding, to another position released from the holding effect of such wheel, latch means interposed between such shoe portion and the base for maintaining said shoe portion in said first position and releasable while said shoe portion is in holding engagement with a wheel to permit said shoe portion to move to released position for removal of the chock from a wheel, said wheel engaging shoe portion being flexibly connected to said base to permit said portion to move toward and away from said plane and having a surface adapted to frictionally engage a support surface in said plane on which the base is resting when said shoe portion is in holding engagement with a wheel, and a hold down member rigidly carried by said base and positioned to engage loosely beneath and to act against a lower portion of a wheel bearing against said stopping member to prevent overturning the chock.

11. A wheel chock comprising a base having parts defining a plane and adapted to rest on a floor or the like, said plane being spaced from and substantially parallel to the floor or the like when the chock is in operative position, a wheel stopping member carried by and spaced laterally from said base in a direction upwardly from said plane when the chock is in operative position, and an anchor shoe secured to said base and positioned to underlie a portion of a wheel engaging said stopping member when the chock is in operative position on a floor or the like, a portion of said shoe adapted to so underlie a wheel being positioned with respect to the base to engage a lower portion of such wheel and be held down thereby against the floor or the like and anchor the chock against sliding, said shoe portion being movable with respect to said base and stopping member to permit limited overturning movement of said base and stopping member while said shoe portion is so held down, and anti-skid projections on said base positioned to clear said plane and when the same is in normal position on a flat supporting surface to clear such surface, and to engage such surface to prevent skidding of the chock thereon upon the beginning of an overturning movement of the chock.

12. A wheel chock constructed in accordance with claim 11 in combination with means connected to the base and positioned to underlie a wheel bearing against said stopping member to engage beneath such wheel upon the beginning of an overturning movement of the chock and limit the overturning movement.

13. A wheel chock constructed in accordance with claim 11 in combination with cam means rotatably mounted on said base for movement thereon between a position out of engagement with said supporting surface to permit the base to rest on the floor and a position in engagement with the floor or the like for raising the front of the base and disengaging said anti-skid projections.

References Cited in the file of this patent

UNITED STATES PATENTS

| | | |
|---|---|---|
| 1,229,714 | Clark et al. | June 12, 1917 |
| 2,818,940 | Boyle | Jan. 7, 1958 |